L. L. SIDWELL.
DEVICE FOR HANDLING TREE FUMIGATING TENTS.
APPLICATION FILED MAR. 20, 1913.
1,093,656.
Patented Apr. 21, 1914.
2 SHEETS—SHEET 1.
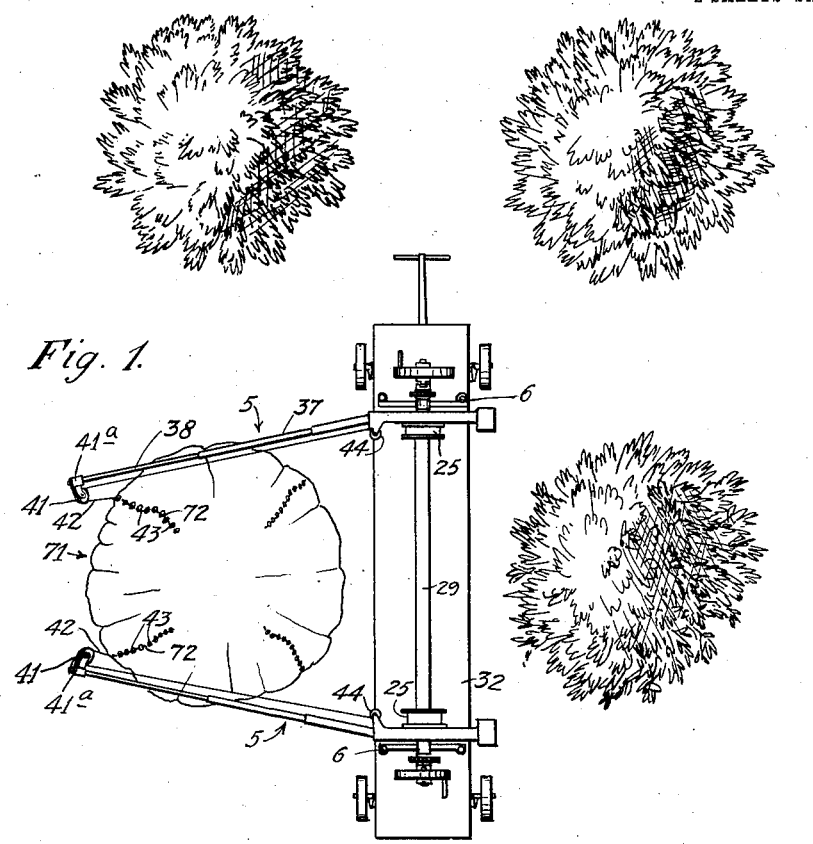
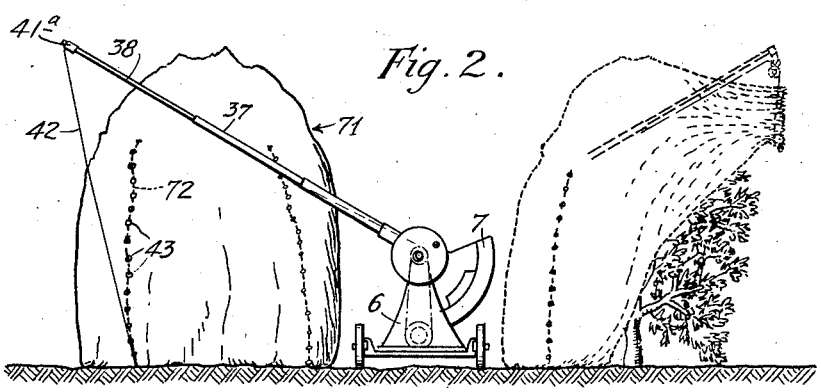
Witnesses.
E. Maag
J. B. Kendall
Inventor:
Lester L. Sidwell
by Albert H. Merrill
atty.

L. L. SIDWELL.
DEVICE FOR HANDLING TREE FUMIGATING TENTS.
APPLICATION FILED MAR. 20, 1913.
1,093,656.
Patented Apr. 21, 1914.
2 SHEETS—SHEET 2.
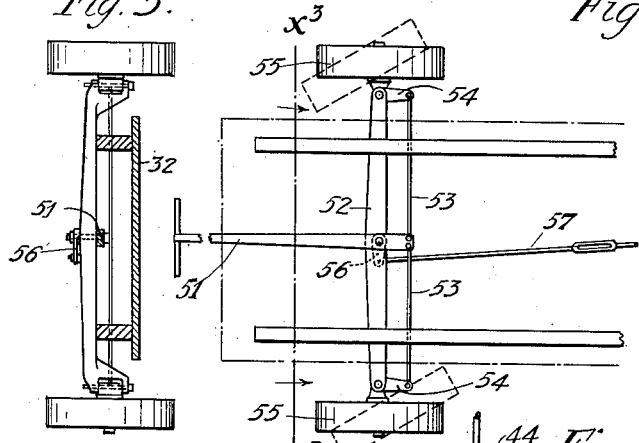
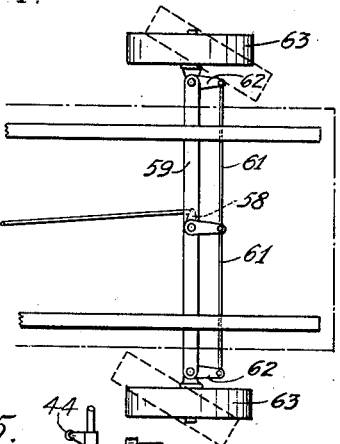
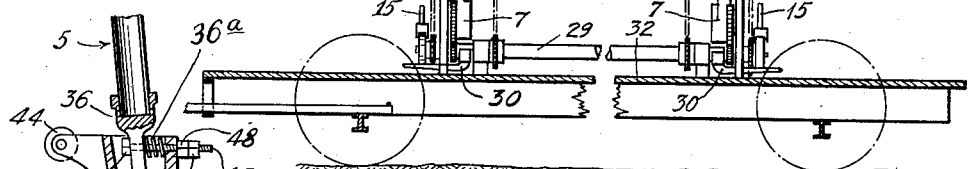
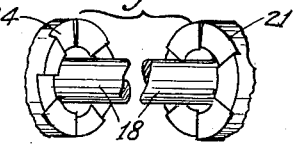
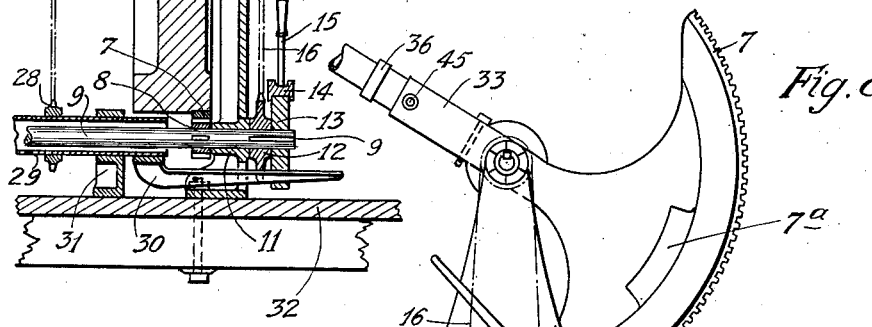
Witnesses:
E. Maag
J. B. Kendall
Inventor:
Lester L. Sidwell
By Albert H. Merrill
atty.
COLUMBIA PLANOGRAPH CO., WASHINGTON, D. C.

UNITED STATES PATENT OFFICE.

LESTER L. SIDWELL, OF RIVERA, CALIFORNIA.

DEVICE FOR HANDLING TREE-FUMIGATING TENTS.

1,093,656.   Specification of Letters Patent.   Patented Apr. 21, 1914.

Application filed March 20, 1913. Serial No. 755,669.

*To all whom it may concern:*

Be it known that I, LESTER L. SIDWELL, a citizen of the United States, residing in the town of Rivera, Los Angeles county, California, have invented a new and useful Device for Handling Tree-Fumigating Tents, of which the following is a specification.

In the care of citrus fruit trees it is found necessary to fumigate the trees from time to time to exterminate scale and other parasites. In order to do effective fumigating of this kind it is necessary to confine the fumes by enveloping each tree with a canopy or tent while the fumes are being applied to such tree, and then to transfer said canopy or tent to another tree of the orchard in order that the same canopy may be used in the fumigation of a number of trees.

An object of this invention is to provide improved means for operating the tent moving booms which have been employed in machines of this class. By this invention it is possible to swing the tent moving booms from a position in which they project astride a tree at one side of the machine until they pass astride a tree at the other side of the machine.

A further object is so to balance the tent moving booms upon their pivots that it will be unnecessary to provide any brace to prevent the overturn of the vehicle upon which the booms are mounted.

Still another object of the invention is to provide for the removal of the canopy from a tree in a manner that will cause less friction of the same against the tree from which the canopy is being removed, and which will also place the canopy over the next tree to be fumigated in a manner that will not rub upon the tree in an injurious fashion. The facility with which this machine handles the canopy reduces the wear and tear of the tent to the minimum, and also avoids injury to the branches and fruit of the trees.

Other objects and advantages may hereinafter appear.

Referring to the accompanying drawings which illustrate the invention, Figure 1 is a plan view of the machine showing same ready to remove the canopy from a tree at one side of the machine, and place it over a tree at the other side of the machine. Fig. 1$^a$ is a broken side elevation illustrating the means for swiveling the pulleys to the end portions of the booms. Fig. 1$^b$ is a similar view to Fig. 1$^a$, looking at the edge of the pulley. Fig. 2 is an end elevation of the machine located as shown in Fig. 1, the position of the canopy being also indicated as the same is being placed over another tree. Fig. 3 is a section on line $x^3$—$x^3$ of Fig. 4. Fig. 4 is a plan view of the running gear of the vehicle upon which the tent moving device is supported. Fig. 5 is a side elevation of the machine, the body of the vehicle being sectioned. Fig. 6 is an enlarged sectional view of the boom-operating and rope-operating means. Fig. 7 is an enlarged perspective detail of certain drums provided with ratchet teeth to transfer the power from the tent-moving-ropes to the booms, and vice versa. Fig. 8 is an enlarged detail of the base portion of one of the booms showing also part of the brake mechanism.

Referring in detail to the drawings each of the tent moving booms 5 is pivotally supported upon a standard 6, said booms being arranged and operated to swing from one side of the machine to the other, as indicated in full lines, and in dotted lines in Fig. 2. Each boom 5 is provided with a large toothed segment 7 that is in mesh with a cog wheel 8, fixed to a shaft 9. Said shaft 9 has near each end a bearing 11 to support the same; to each end of said shaft 9 is fixed a sprocket wheel 12, and a brake wheel 13. The brake wheel 13 is engaged by a brake shoe 14 operated by a lever 15; the sprocket wheel 12 is connected by the chain 16 with a sprocket wheel 17, said sprocket wheel 17 being loosely mounted on a shaft 18. Said shaft 18 has its bearing in the standard 6 already referred to.

Upon each end of shaft 18 is mounted a crank wheel 19 which is slidable along, but splined to shaft 18. Upon the extreme end of shaft 18 is fixed a toothed drum 21, said crank wheel 19 having an outer toothed portion 22 movable into and out of engagement with said drum 21. Upon the inner side of crank wheel 19 are formed teeth 23 which are movable into and out of engagement with the toothed drum 24 which forms a portion of the sprocket wheel 17 already referred to.

To the inner end of shaft 18 is fixed a rope-winding drum 25, and also a sprocket wheel 26. From said sprocket wheel 26 a chain 27 communicates power to a sprocket wheel 28, fixed to a hollow shaft 29. A foot operated brake 30 is arranged to operate against said hollow shaft 29. Said hollow shaft 29 has its bearings in short standards 31 which extend up from the bed 32 of the vehicle.

Each segment 7 (see Fig. 8) is provided with a shank 33 within which is formed a hub 34 having a bearing upon the shaft 18 already referred to. The arrangement of parts shown in Fig. 6 is duplicated at each end of the vehicle bed 32, as shown in Figs. 1 and 5. Each segment 7 is preferably weighted at 7$^a$.

The base section 36 of each boom 5 preferably consists of a large hollow tube which is secured in the end of the shank 33 as best shown in Fig. 6. Said shank 33 of each boom is deflected toward the center of the machine to cause the booms to converge at their outer ends as shown in Fig. 1. This construction is preferred in order to bring the tent lifting means proper, next to be described, more nearly in vertical alinement with the portions of the tent upon which they operate.

The booms 5, in addition to their base sections 36, may be provided with two or more telescopic sections 37 and 38, in order that the booms may be adjusted to the desired length.

Each boom carries at its outer end a swiveled pulley 41 over which is led a tent lifting connection 42. Said tent lifting connection 42 passes through a series of rings 43 carried by the tent and is fastened to the tent preferably by the uppermost ring of said series. The other end of connection 42 is led down to the rope-winding-drum 25 already referred to. In passing from the pulley 41 to the drum 25 said connection 42 is led under a pulley 44 carried by the shank 33 at the point where said shank is deflected. This arrangement causes the rope 42 to truly wind on the drum 25. Pulleys 41 are swiveled to short arms 41$^a$.

In practice, it is desirable to vary the angle of the booms 5 with relation to each other in order that the ends of said booms may be brought nearer together when small tents are being handled, and may be separated farther when large tents are being handled. For this purpose I pivot the base section 36 of the booms upon a pin 43 carried by the shank 33. Said shank 33 is formed as best shown in Figs. 6 and 8 to act as a guide wherein the base section 36 of each boom swings. Upon one side of said section 36 is a compression spring 36$^a$ which tends to swing the boom inwardly. An adjusting bolt 45 extends through said spring, and also through a hole in the section 36, and has a head 46 which may be drawn against the inner side of section 36 by means of the nut 48 to adjust the angle of the boom.

47 is a lock nut.

Referring now more particularly to Figs. 3 and 4 the tent moving apparatus thus far described is preferably mounted upon a vehicle specially constructed to make quick turns so as to be readily guided among the trees of an orchard. Said vehicle is provided with a tongue 51 which is pivoted at a short distance from its rear end to the front axle 52. To the extreme rear end of said tongue is fastened a pair of connecting rods 53, the outer ends of which are connected to the steering arms 54 of the front wheels 55. Said tongue 51 is also provided with a short extension 56 at the point where it is pivoted to the front axle, said extension projecting at right angles to the tongue. At the end of said extension is pivotally secured a reach rod 57. Said reach rod, by means of a bell crank 58, mounted upon the rear axle 59, operates the rear connecting rods 61 which are connected to the steering arms 62 of the rear wheels 63. This arrangement causes the vehicle to make a turn in one half the space that would be necessary if the steering means were confined to the front wheels only.

In order to keep the crank wheel 19 in engagement with the toothed drum 21 while operating the ropes, and in order to keep said crank wheel 19 in engagement with the toothed part 24 while operating the booms (said crank wheel 19 being slidable along shaft 18 to which it is splined, from the part 21 to the part 24) a dog 65 is pivoted to a bracket 66 and the crank wheel 19 is provided with a hub 67 having a bead 68 therearound. When said dog 65 is dropped on the inner side of said bead it holds the crank wheel 19 in engagement with the part 21, and when said dog is dropped on the outer side of said bead it holds said crank wheel 19 in engagement with the part 24. In the latter case the crank wheel will operate the booms 5 in both directions; in the former case said crank wheel will operate the tent moving ropes, winding up or unwinding said ropes as desired.

In operation the tent moving booms 5 are first adjusted to a substantially vertical position. The vehicle is then driven into the orchard between trees until it reaches the position shown in Fig. 1 with respect to the canopy or tent 71 there shown over a tree. The tent moving ropes are then connected to the farthest side of the tent 71 being hooked onto cords 72 which are permanently connected to the tent. Said cords 72 are attached to the uppermost of the rings 43. The crank wheels 19 are then moved to the outer position and put into operation in the proper direction to lift the tent by first pulling upon the base portion thereof farthest from the vehicle. The swinging of the booms is continued and the same are moved in unison until they extend from the other side of the vehicle as indicated in dotted lines in Fig. 2. From this position, when the tent cords are released the tent readily falls to cover the tree.

Owing to the pulleys 41 at the ends of booms 5 being swiveled axially with relation to the arms 41ª that project inwardly from one boom toward the other boom, said pulleys 41 automatically adjust themselves to the tent moving ropes when the booms are swung across the vehicle from one side to the other thereof. Heretofore, so far as I am aware, no tent moving device has been constructed capable of removing a tent from a tree at one side of the vehicle and conveying such tent across the vehicle to the other side thereof to place the same over a tree in the latter location.

If desired, the machine may be operated by an engine (not shown) which workmen skilled in the art will readily connect with the operating mechanism.

It is to be understood that the invention is not limited to the precise construction shown, but various details may be changed by those skilled in the art without departing from the spirit of the invention as defined by the claims.

I claim:

1. In a tent moving machine, a support, a pair of booms mounted on said support to swing from one side thereof to the other side thereof, means to operate said booms, hoisting ropes carried by said booms, means to operate said ropes, and means to adjust the angle of said booms with relation to each other.

2. In a device of the character described, a support, a pair of booms, means to swing said booms from side to side of said support, a compression spring located at the side of each boom, and means to adjust the booms against the opposition of said springs to vary the angle of said booms with relation to each other.

In testimony whereof I have hereunto signed my name in the presence of two subscribing witnesses at Los Angeles, in the county of Los Angeles and State of California, this 13th day of March, 1913.

LESTER L. SIDWELL.

Witnesses:
J. STANLEY LOWE,
ALBERT H. MERRILL.

---

Copies of this patent may be obtained for five cents each, by addressing the "Commissioner of Patents, Washington, D. C."